Figure 1:
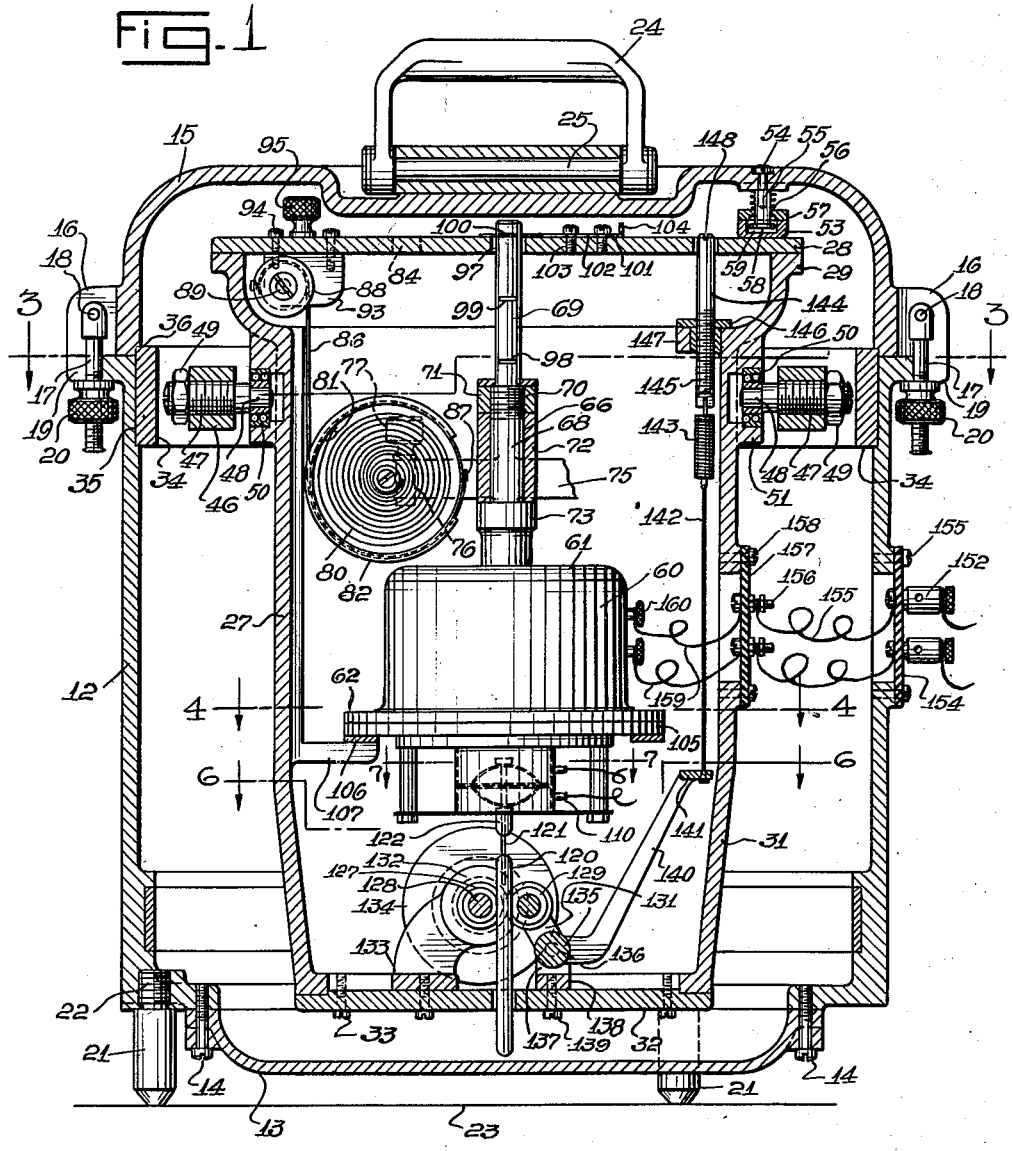

Nov. 19, 1935.　　　　　I. G. ROSS ET AL　　　　　2,021,330

APPARATUS FOR MEASURING VIBRATION

Filed June 29, 1932　　　4 Sheets-Sheet 1

INVENTORS
IRA G. ROSS.
BERNARD T. BALLARD
BY
ATTORNEY

Nov. 19, 1935.    I. G. ROSS ET AL    2,021,330
APPARATUS FOR MEASURING VIBRATION
Filed June 29, 1932    4 Sheets-Sheet 2
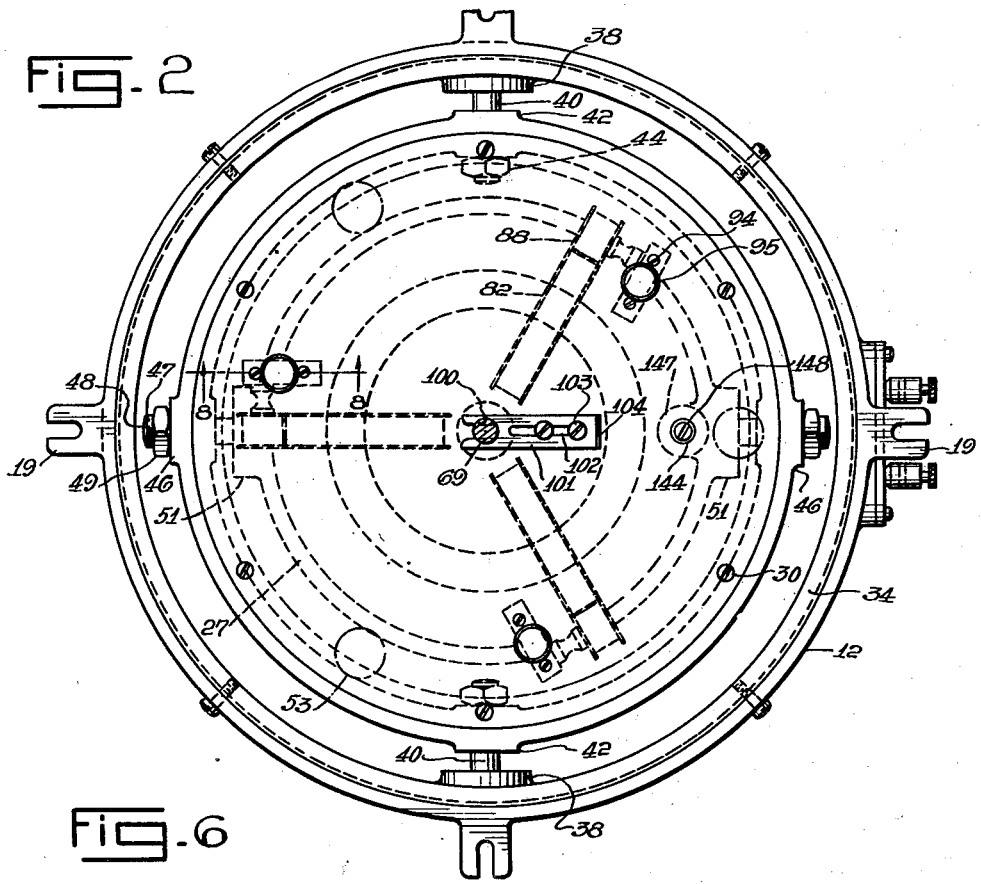
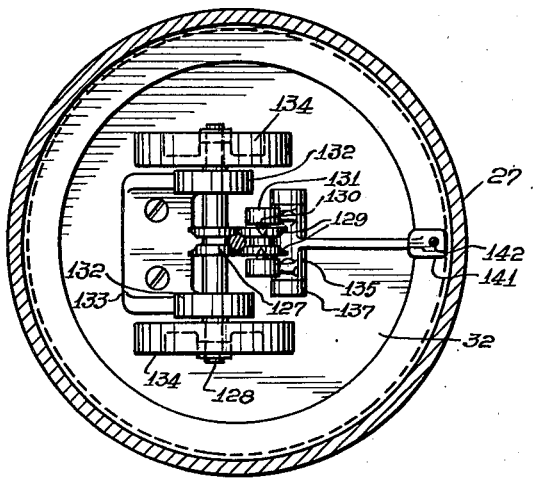
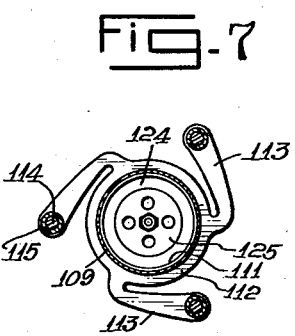
INVENTORS
IRA G. ROSS.
BERNARD T. BALLARD
BY
ATTORNEY

INVENTORS
IRA G. ROSS.
BERNARD T. BALLARD.
ATTORNEY

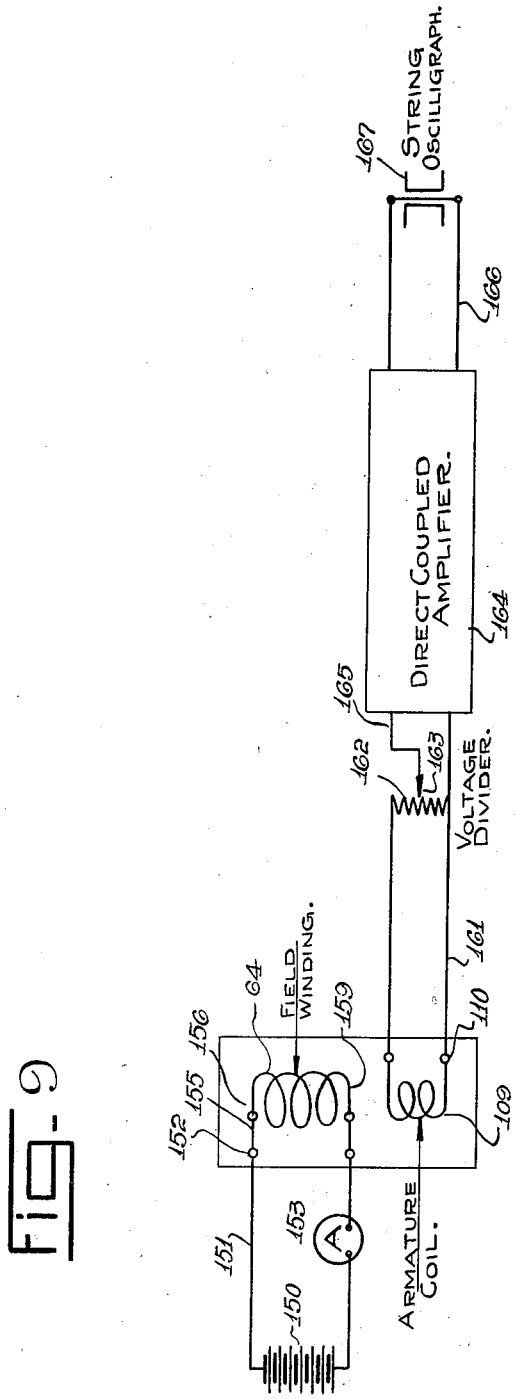

Patented Nov. 19, 1935

2,021,330

UNITED STATES PATENT OFFICE 2,021,330

APPARATUS FOR MEASURING VIBRATION

Ira G. Ross, Chicago, and Bernard T. Ballard, Lombard, Ill., assignors to United States Gypsum Company, Chicago, Ill., a corporation of Illinois Application June 29, 1932, Serial No. 619,878

8 Claims. (Cl. 177—352)

This invention relates to instruments for measuring vibration, such as that caused by moving machinery.

In the study of the vibration of moving machinery with a view of isolating the vibration, it becomes necessary to have a sensitive instrument with which the amplitude and frequency of the vibration can be accurately measured. With some vibratory measurements, such as those produced by the engines or motors of boats, elevators, automobiles, etc., where low frequency, high amplitude, movement of the body, etc., occur simultaneously and independently of the high frequency vibration to be measured, it is necessary to have an instrument which will measure the high frequency vibration without being influenced by the superimposed low frequency movement. For these special boat and automobile problems, it is also necessary to have an instrument which is self-leveling in order that the vibration characteristics of the motors can be accurately measured.

An object of this invention therefore is to provide a vibration measuring apparatus suitable for measuring and recording the vibration of moving machinery and for also recording the vibration of vibration insulating bases for said machinery.

Another object of the invention is to provide methods of and means for measuring high frequency vibrations in the presence of low frequency vibrations.

A further object of the invention is to provide an apparatus of the class described which may be used in the study of special problems, such as the measurement of vibration in a ship caused by its motors while the ship is rising and falling on the waves at a certain low frequency.

A further object of the invention is to provide an apparatus suitable for studying the action of range finders on shipboard, the vibration of moving automobiles from their motors, etc.

A further object of the invention is to provide an apparatus for measuring vibration which will be self-leveling so as to insure the accuracy of the instrument regardless of the manner in which a machinery base is rocking or rolling.

A still further object of the invention is to provide a method of measuring and recording the vibrations of moving machinery through the use of our improved apparatus; also to improve methods of and apparatus for measuring vibration in other respects hereinafter specified and claimed.

Figure 8:
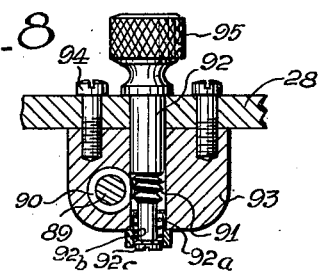
Figure 3:
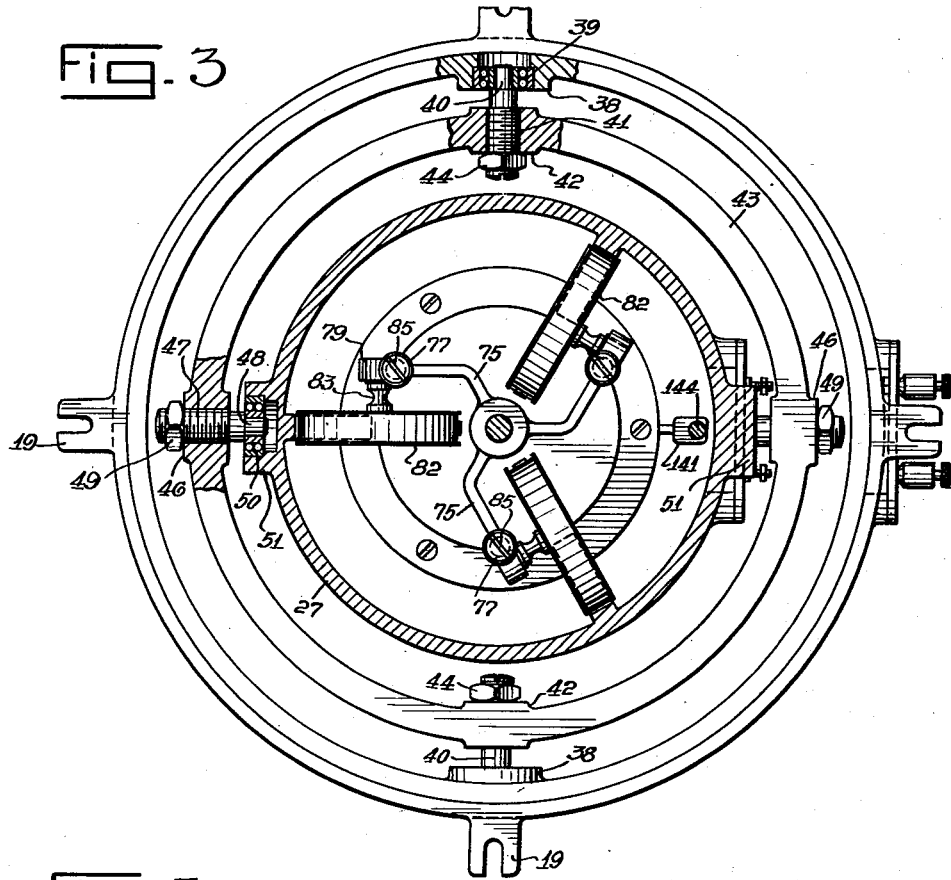
Figures 4, 5:
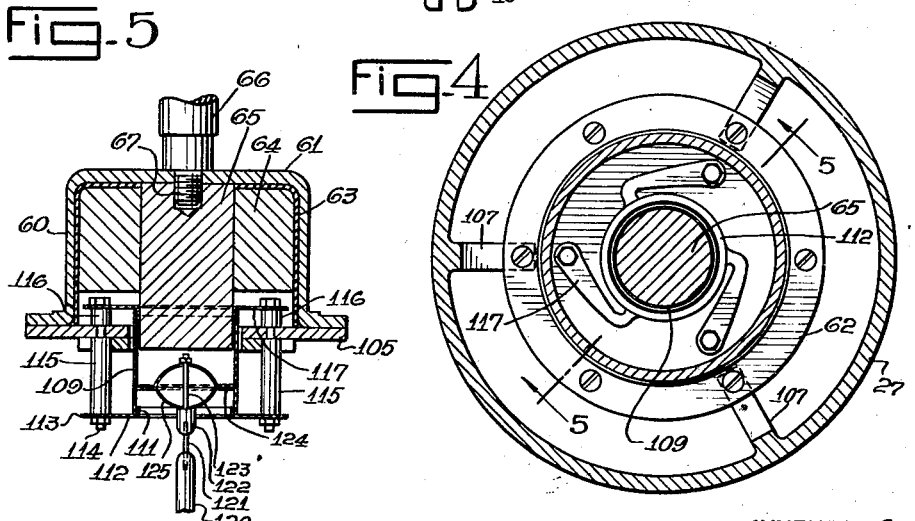

Reference is to be had to the accompanying drawings forming a part of this specification, in which Fig. 1 is a sectional elevation through our improved vibration measuring apparatus, Fig. 2 is a plan view of the apparatus with cover removed, Fig. 3 is a sectional plan view through the apparatus taken on line 3—3 of Fig. 1, Fig. 4 is a sectional view through the apparatus taken on line 4—4 of Fig. 1, Fig. 5 is a sectional elevation through the apparatus taken on line 5—5 of Fig. 4, Fig. 6 is a sectional plan view through the apparatus taken on line 6—6 of Fig. 1, Fig. 7 is a sectional view through the apparatus on line 7—7 of Fig. 1, Fig. 8 is a sectional view through the apparatus taken on line 8—8 of Fig. 2, Fig. 9 is a wiring diagram showing the relation of the vibration measuring instrument to the instruments for recording the vibration characteristics of a moving machine.

Our improved instrument is of the electrodynamic type and is intended for use in connection with the measurement of amplitude and frequency of vibration in conjunction with suitable amplifying and recording devices. The instrument may be known as a seismometer. When this instrument is subjected to a vibratory motion from any source, it is capable of transferring the physical impulses into electrical impulses corresponding in frequency and amplitude to that of the imposed vibration. The feeble alternating current generated in the instrument, is built up by means of a series of vacuum tube amplifiers until it possesses sufficient power to operate a recording device. Throughout this amplification process, the wave form remains unchanged. In order to get a pictorial representation of this wave form, use is made of an ordinary string oscillograph equipped with a camera which reproduces and photographs the instantaneous wave form at any time. To establish the frequency of the wave to be measured, use is made of a timing device which superimposes on the photographic record a secondary wave which possesses a constant frequency, the value of which may be arbitrarily chosen by the operator.

The seismometer preferably consists in a cylindrical housing 12 which is provided with a removable bottom 13 attached to the housing by means of screws 14, and is also provided with a removable cover 15. The cover 15 has a plurality of pairs of outstanding lugs 16, each pair of which has a bolt 17 pivotally secured thereto by means of pins 18. Outstanding forked lugs 19 are formed on the housing 12 to register with the lugs 16 so as to receive the bolts 17 suspended from a pin 18. Knurled nuts 20 serve to tighten against the lugs 19 and secure the cover 15 in position on the housing. A plurality of legs 21 are provided with threaded sections 22 which screw into the bottom of the housing 12 and serve to support the housing upon a floor 23, machine base or any other structure subject to vibration from a moving machine. The handle 24 is pivotally secured by means of pin 25 to the cover 15 so that the instrument can be readily carried from place to place for testing purposes.

Concentrically mounted within the housing 12, is an inner cylindrical housing 27 which is provided with a cover 28 secured to an outwardly extending flange 29 on housing 27 by means of screws 30. The bottom of the housing 27 has a frusto-conical section 31 which is closed at the bottom end by a circular plate 32 secured to the section 31 by means of screws 33. The housing 27 is suspended within the housing 12 by universal connections so that the housing 27 is always self-levelling. The universal connection consists of a ring 34 fitted within a recess 35 formed in the inner-wall of the housing 12, and a recess 36 formed in the inner-wall of the cover 15. A pair of diametrically opposite hubs 38 are formed on the inside surface of the ring 34, and are adapted to receiving ball-bearings 39 which pivotally support the outer ends of a pair of studs 40. The inner-ends of studs 40 are provided with threaded sections 41 which engage in hubs 42 formed on a ring 43, the latter being concentrically mounted within the ring 34. A lock nut 44 serves to lock the threaded section and studs in any adjusted position. The ring 43 is provided with a pair of diametrically opposite hubs 46 which are arranged at 90° to the hubs 42 and serve to receive the threaded section 47 of studs 48. Lock nuts 49 secure the studs 48 in any adjusted position. The inner-ends of studs 48 are of reduced diameter and are pivotally supported in ball-bearings 50 which are carried in outstanding hubs 51 formed on the outside of housing 27.

It will be noted that in Fig. 1 the apparatus is shown as being locked in position so that it can be carried from place to place without damage to the parts. In order to keep the housing 27 from swinging on its universal couplings during transportation, spring-held pressure feet 53 are connected to the inside of the cover 15 by means of screws 54 passing through said cover and threaded to engage the inside of a sleeve 55. A spring 56 encloses the sleeve 55 and extends between the cover 15 and a cover 57 secured to the top of each pressure foot 53. An annular flange 58 formed on the bottom of the sleeve 55 engages in an inside recess 59 formed in the pressure foot 53 so as to give a loose connection between said pressure foot and the rigidly held sleeve 55.

Mounted within the housing 27, is a cylindrical microphone shell 60 having an integral top 61 and an annular outstanding flange 62 around its bottom. The shell 60 (see Fig. 5) is lined with an insulating material 63, and a field coil 64 is positioned within the insulation 63, being wound around a soft-iron magnet pole piece 65. A stud 66 has a threaded section 67 of smaller diameter passing through the top 60 and screwed into a tapped opening in the core pole 65. The stud 66 has an upper section 68 of smaller diameter, and an uppermost section 69 of still smaller diameter (see Fig. 1). Section 68 is provided with threads 70 for engaging with a lock nut 71 which serves to confine a hub 72 between said lock nut and an annular shoulder 73 formed on the stud 66.

In order to resiliently suspend the shell 60 and its associated parts from the cover 28, a plurality of arms 75 of irregular shape (Fig. 3) are formed on the hub 72 and are provided on their outer ends with a hub 76 which rotatably receives the lower end of a tension adjusting screw 77, the latter being prevented from axial movement in the hub 76, but being provided inside the hub with a worm section engaging with a worm wheel rotatably mounted within a housing 79 formed on the outer end of each arm 75. The worm wheel has a shaft passing transversally through the vertical wall of housing 79, and said shaft is connected with the inner-end of coil spring 80 which is coiled about said shaft, the outer-end of each coil spring 80 being secured by lug 81 to a spring housing 82 secured to a spacer member 83, the latter being rigidly mounted upon housing 79. An opening 84 is provided in the cover 28 above each of the adjusting screws 77 so that a screwdriver may be inserted through said opening to engage a slot 85 in the screw head 77. The housing 82 is rotatably mounted with reference to the housing 79 and a tape 86 extends around the periphery of said housing 82, one end of said tape being secured by a pin 87 to said housing 82. The tape 86 passes upwardly over an annular winding drum 88 which is rotatably mounted upon a shaft 89 (Fig. 8), said shaft being provided with a worm wheel 90 which engages with a worm 91 formed on a stud 92, said stud 92 being rotatably received in a bearing block 93 secured to the cover 28 by means of screws 94. The outer-end of stud 92 is provided with a knurled adjusting head 95 so that by adjusting each of the three heads 95, a central and concentric position of the shell 60 relative to the housing 27 is maintained at all times. The outer end of stud 92 is rotatably received within a spring cylinder 92a having a coil spring 92b confined between the end of cylinder 92a and a screw 92c threaded into the end of stud 92 so as to resiliently urge said stud axially and resist the thrust action of the worm 91.

The stud section 69 passes upwardly to a point a short distance above the cover 28 through an opening 97 formed in said cover. This stud section 69 has a plurality, preferably 3 in number, of oppositely disposed pairs of slots 98, 99, and 100 formed at different heights thereon, these slots being arranged to receive a locking slide 101 which is slidably mounted on the top of the cover 28. The slide 101 is provided with a slot 102 for receiving guide screws 103 which are threaded into the cover 28 and also serve to limit the sliding movement of said slide 101. An upturned end 104 is formed on the slide 101 for manual manipulation in moving said slide 101 into or out of engagement with the stud section 69. As seen in Fig. 1 with the apparatus locked in position for transportation, the slide 101 engages with the upper slot 100 so as to hold the shell 60 in its lowermost position with a cover 105, secured to the flange 62, resting in contact with a felt ring 106, which is supported on outstanding arms 107 formed on the inside of the housing 27.

The lower end of the magnet core 65 extends substantially below the field coil 64 and an armature coil 109 wound in cylindrical form on an insulating cylinder, telescopically surrounds the lower end of said core 65. When the coil 64 is energized by passing a direct current therethrough, the core 65 is magnetized and a magnetic flux surrounds the armature coil 109 so that any movement of the armature coil 109 relative to the core 65 sets up an alternating current in said armature coil, and said alternating current is led through terminals 110 connected to said armature coil and to an amplifying and recording system to be hereinafter described.

The armature coil 109 is connected at its ends to a ring 111 which in turn supports an annular spider 112 of insulating material, said spider 112 having outstanding tangentially extending arms 113 of high flexibility and sensitivity which are preferably three in number as seen in Fig. 7. The outer end of each of the arms 113 is connected to a bolt 114 which passes through the shell bottom 105 and is provided with spacer sleeves 115 and 116 on each side of said bottom, for accurately positioning the arms 113 relative to the core 65, and a similar set of flexible and insulating spider arms 117 connected to the upper end of the armature coil 109 inside the shell 60. The arms 113 and 117 are preferably made of laminated phenol condensation material and have sufficient flexibility so as to permit the vertical reciprocation of the armature coil 109 relative to the core 65.

As previously pointed out, the legs 21 of the housing 12 are supported upon a surface 23 which may be subjected to vibrations of two or more frequencies, a high frequency vibration as might be caused by the motors of a boat, or other moving machinery, and very low frequency vibration which might be caused by the rolling and pitching of a boat upon a rough sea, or the movement of an automobile travelling over a rough road. The low frequency movements or vibrations generally have a high amplitude and normally tend to cause the slow movement of the microphone shell 60. By high frequency, we means frequency above 1½ cycles per second. Because of the low frequency movement of the housings 12 and 27, it is impossible to employ a rigid coupling between the frame of the seismometer and the armature coil 109, since the microphone shell 60 is moving slowly with respect to said housing.

To permit the movement of the microphone shell 60 due to low frequency movement of the surface 23, and still maintain a positive coupling for high-frequencies between the housing 27 and the armature coil 109, we provide a rod 120 which is connected by a flexible piece of spring steel 121 to a rod section 122, the latter being secured by a bolt 123 to a double diaphragm 124 which is preferably annular in shape and is secured to the inside of the armature coil 109. The diaphragm 124 is preferably formed into a pair of semi-spherical, oppositely facing members 125 which serve to give rigidity to the diaphragm 124. The rod 120 is positioned to engage between a grooved roller 127 which is secured upon a shaft 128, and a grooved roller 129 which is rotatably supported upon bearing points 130 rigidly secured to a pair of bell crank lever arms 131. The shaft 128 is rotatably supported in bearings 132 which are formed on a bracket 133, and the outer ends of the shaft 128 have secured to them a pair of high-inertia, weighted flywheels 134 for retarding the rotation of shaft 128 resulting from frictional contact of the roller 127 on rod 120. The lever arms 131 are formed integrally with a hub 135 which is rotatably supported by means of pin 136 between a pair of upstanding legs 137 formed on a bracket 138 which is secured by screws 139 to the housing bottom 32. A lever arm 140 extends upwardly from hub 135, and its upper end is provided with a laterally extending flange 141 which is attached by a connecting wire 142 to a coil spring 143. The upper end of spring 143 is connected to the lower end of a screw 144 which has a threaded section 145 arranged to be received in a bushing 146 carried by flange 147 formed on the housing 27. The upper end of screw 144 extends through the cover 28 and is provided with a screwdriver slot 148 so that the tension of the spring 143 can be adjusted to vary the pressure of rollers 127 and 129 on the rod 120 so as to obtain the proper operative adjustment. It will be seen that the mechanism described will transmit high frequency movements of housings 12 and 27 through the rod 120 to the armature coil 109 without rotating the inertia flywheels 134. However, very low frequency movement of the housing 27 will cause the flywheels to rotate and permit relative movement between housing 27 and shell 60.

In Fig. 9 a wiring diagram is shown in which other necessary apparatus in circuit with our seismometer are illustrated. A storage battery 150 is connected by wires 151 to terminal posts 152 on the housing 12, an ammeter 153 being included in series in the circuit 151. The posts 152 are secured on a piece of insulation 154 which is secured to the housing 12 by screws 155a. Wires 155 lead from posts 152 to posts 156 which are mounted on a piece of insulation 157, the latter being secured to the movable housing 27 by screws 158. Wires 159 lead from posts 156 to field winding posts 160 which are mounted on shell 60 but are insulated therefrom, said posts 160 being connected to field winding 64. The armature coil 109 is connected to terminal posts 110 and the latter in turn are connected by wires 161 in a closed circuit including a resistance coil 162 having a movable contact 163 forming a voltage divider. A direct coupled amplifier 164 including radio amplifying tubes, is connected by wires 165 to the voltage divider 163 and in turn is connected by wires 166 to a string oscillograph 167 of a type well known to the art. The impulses corresponding to the vibrations set up in the floor 23 are thus transmitted through the apparatus and may be photographed in the oscillograph 167 to secure permanent photographic records of the vibratory movements.

In operation, the seismometer housing 27 is set upon the floor 23 or other body whose vibratory movement is to be studied. The inner housing 27 hangs exactly vertically due to its universal suspension on pivot studs 48, said studs 48 being carried on the ring 43 which in turn is pivotally supported on studs 40 mounted on the housing 12. The cover 15 of the seismometer is now removed after unscrewing the nuts 20, the removal of the cover 15 serving to release the spring held pressure feet 53 from the cover 28 of the inner housing 27, thus leaving the latter free to swing to an exactly vertical position. The slide 101 is now moved longitudinally to release the stud section 69 thus allowing said stud and the connected field winding shell 60 to rise vertically somewhat out of contact with the stop ring 106 under the action of supporting coil springs 80. The tension of the springs 80 is adjusted by means of adjusting heads 95 which rotate drums 88 and wind or unwind tapes 86 which are secured to the spring housing 82.

The armature coil 109 telescopes around the magnet pole 65 which is energized by direct current passing through the field coil 64. Armature coil 109 is supported on flexible spider rings 112 and 117 so that it is free to vibrate axially under the influence of vibratory forces. In order to transmit high frequency vibrations from housings 12 and 27 to the armature coil 109, rod 120 passes freely through an opening in the housing bottom 32, and also passes between the pair of grooved friction rolls 127 and 129 which are rotatably supported by brackets 133 and 137 respectively on the housing bottom 32. Roller 129 exerts a yielding pressure against the rod 120 through lever 140, wire 142 and spring 143. The high and low frequency vibrations to which surface 23 is subjected, due, for example, to the combined action of a moving machine and the substantially vertical rising and falling of surface 23 in a boat or an automobile in motion, cause a similar vibration to take place in housings 12 and 27 since the seismometer is positioned directly and firmly upon surface 23. Shell 60 and its connected parts, including coil 109 and rod 120, being substantially freely suspended within housing 27 by means of arms 75, springs 80, and tapes 86, will, however, due to the forces of gravity and inertia, tend to maintain a uniform level when housings 12 and 27 are vibrated perpendicularly. Thus, as housings 12 and 27 vibrate up and down, shell 60 and magnet 65 will move up and down obversely within the instrument, slowly for low frequency vibrations and rapidly for the concurrent high frequency vibrations. Under the influence of the low frequency vibrations and the relatively slow movement of the magnet assembly, rod 120, which is frictionally engaged by rollers 127 and 129, will cause rotation of these friction rollers because the movement is relatively gradual enough to overcome inertia wheels 134 so as to cause their rotation. The movement of rod 120 under the influence of high frequency vibrations, however, is too rapid to overcome inertia wheels 134 whereby to cause rolls 127 and 129 to rotate, and since these rolls are connected to bottom 32 of housing 27, it is apparent that during high frequency vibrations, rod 120 will be prevented from following the movements of magnet 65 but will be caused to follow the vibratory movements imparted to the housings from surface 23. Since rod 120 is connected to coil 109, which is resiliently held by spiders 112 and 117, coil 109 will likewise be prevented from following the movements of magnet 65 during high frequency vibrations, whereby the end of magnet 65 is reciprocated axially within coil 109 which is in the magnetic field surrounding said magnet. Thus, alternating electrical impulses are generated in coil 109 and pass through wires 161 and 165 into the amplifier 164, from which the amplified impulses pass through wires 166 to the oscillograph 167 where the vibration wave traces are translated by means of an oscillating light beam projected on a ground glass plate into an animated visible record of the amplitude and intensity of the vibrations, which may then be photographed for permanent record. Direct current for energizing the field coil 64 passes through wires 151 from a storage battery 150. The universal connection between housings 12 and 27 permits housing 27 to maintain a position substantially axially perpendicular to the earth's surface, whereby distortion or other interference with the relatively fine adjustment of the magnet and rod assembly will be prevented, without destroying the necessary substantially direct vibrational connection of housing 27 and rolls 127 and 129 with vibrating surface 23. The reduced diameter of frusto-conical section 31 of housing 27 permits said housing to swing in a substantial arc within housing 12 when the latter housing is caused to side-sway.

We would state in conclusion that while the illustrated example constitutes a practical embodiment of our invention, we do not wish to limit ourselves precisely to these details since manifestly, the same may be considerably varied without departing from the spirit of the invention as defined in the appended claims.

Having thus described our invention, we claim as new and desire to secure by Letters Patent:—

1. In a vibration measuring instrument, an electromagnet of substantial mass, housing means for movably and resiliently supporting said magnet on a surface subject to high and low frequency vibrations, an armature coil positioned in the magnetic flux of said magnet and yieldingly connected to said magnet, and controlling means connected to said coil arranged to retard the movement of said coil relative to said magnet due to low frequency vibrations, said controlling means being arranged to cause the vibration of said coil relative to said magnet due to high frequency vibration of said surface whereby to generate electric impulses corresponding to said high frequency vibrations.

2. In an instrument of the class described an electromagnet of substantial mass, means for resiliently supporting said magnet on a surface subject to high and low frequency vibrations, an armature coil positioned in the magnetic flux of said magnet and yieldingly connected to said magnet, a rod connected to said coil, and means connecting said rod to said surface and arranged to cause the vibration of said coil relative to said magnet due only to the high frequency vibration of said surface.

3. In a vibration measuring apparatus; a member for contacting with a surface vibrating with low frequency vibrations superimposed upon high frequency vibrations; and means for selectively electrically recording the high frequency vibrations and eliminating the low frequency vibrations, comprising coil and magnetic core elements supported by said member to swing as a unit under the influence of said low frequency vibrations, and means for halting the free swinging of one of said elements under the influence of high frequency vibrations whereby relative movement between said elements takes place and alternating electric impulses are created in said coil.

4. In apparatus of the class described, a magnet, a coil in the magnetic flux of said magnet, said magnet and coil having a common resilient support permitting joint movement of said magnet and coil upon low frequency vibrations of said support, and means connected to said coil and preventing certain movements of said coil whereby said coil is prevented from moving with said magnet upon high frequency vibrations of said support, and the lines of magnetic flux are intersected by the coil to generate electric impulses during said high frequency vibrations.

5. In a vibration measuring instrument, an electro-magnet of substantial mass, means for resiliently supporting said magnet on a surface subject to high and low frequency vibrations, an armature coil positioned in the magnetic flux of said magnet and yieldingly connected to said magnet, a rod connected to said coil, opposed friction rolls rotatably mounted on said supporting means and engaging said rod, said rolls being adapted to be rotated by axial movement of said rod, and a fly wheel of high rotary inertia connected to one of said rolls and arranged to permit rotation of said friction rolls only when said rod is moved in the presence of low frequency vibrations, said fly wheel being adapted to hold said friction rolls and rod substantially motionless during high frequency vibrations of said support so as to cause vibrations of said coil relative to said magnet due only to the high frequency vibrations of said surface.

6. In an instrument of the class described, an electro-magnet of substantial mass, means for resiliently supporting said magnet on a surface subject to high and low frequency vibrations, an armature coil positioned in the magnetic flux of said magnet and yieldingly connected to said magnet, a rod connected to said coil, opposed friction rolls rotatably mounted on said supporting means and engaging said rod, said rolls being adapted to rotate as said rod is moved axially, a fly wheel connected to one of said rolls and having a high rotary inertia so as to allow said friction rolls to rotate during relatively slow movement of said rod, but prevent sudden movement of said rolls and rod, and means for varying the pressure of said rolls upon said rod to obtain the proper operative adjustment.

7. In an instrument of the class described, an electro-magnet of substantial mass, means for resiliently supporting said magnet on a surface subject to high and low frequency vibrations, an armature coil positioned in the magnetic flux of said magnet and yieldingly connected to said magnet, a rod connected to said coil, friction rolls rotatably mounted on said supporting means and engaging said rod to govern the axial movements of said rod, and means for varying the pressure of said rolls upon said rod.

8. In a vibration measuring instrument, an electro-magnet of substantial mass, means for resiliently supporting said magnet on a surface subject to high and low frequency vibrations, an armature coil positioned in the magnetic flux of said magnet and yieldingly connected to said magnet, a rod connected to said coil, opposed friction rollers rotatably mounted on said supporting means and engaging said rod, a lever for pivotally supporting one of said rolls in contact with said rod, spring means for resiliently urging said last mentioned roll toward said rod, and means for adjusting the tension in said spring to secure operative adjustment of said rolls.

IRA G. ROSS.
BERNARD T. BALLARD.